United States Patent
Wang et al.

(10) Patent No.: US 12,530,824 B2
(45) Date of Patent: Jan. 20, 2026

(54) INTERACTION PROCESSING METHODS, APPARATUS, ELECTRONIC DEVICES, STORAGE MEDIA, AND PROGRAM

(71) Applicant: Beijing Zitiao Network Technology Co., Ltd., Beijing (CN)

(72) Inventors: Daoyu Wang, Beijing (CN); Hui Sun, Beijing (CN); Ziyang Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/084,372

(22) Filed: Mar. 19, 2025

(65) Prior Publication Data

US 2025/0308114 A1 Oct. 2, 2025

Related U.S. Application Data

(63) Continuation of application No. PCT/CN2024/084864, filed on Mar. 29, 2024.

(51) Int. Cl.
*G06T 11/60* (2006.01)
*G06F 3/04845* (2022.01)
(Continued)

(52) U.S. Cl.
CPC .......... *G06T 11/60* (2013.01); *G06F 3/04845* (2013.01); *G06V 40/107* (2022.01); *G06V 40/16* (2022.01)

(58) Field of Classification Search
CPC ... G06T 11/60; G06F 3/04845; G06V 40/107; G06V 40/16
See application file for complete search history.

(56) References Cited

U.S. PATENT DOCUMENTS

2018/0321826 A1* 11/2018 Bereza ................ G06F 3/04883
2019/0098099 A1* 3/2019 Goslin .................... A61B 5/165
(Continued)

FOREIGN PATENT DOCUMENTS

CN 102780649 A 11/2012
CN 107612815 A 1/2018
(Continued)

OTHER PUBLICATIONS

ISA China National Intellectual Property Administration, Written Opinion Issued in Application No. PCT/CN2024/084864, Dec. 4, 2024, 7 pages.
(Continued)

*Primary Examiner* — YuJang Tswei
(74) *Attorney, Agent, or Firm* — Alleman Hall & Tuttle LLP

(57) ABSTRACT

The disclosure relates to an interaction processing method and apparatus, an electronic device, a storage medium and a program product, which relates to the technical field of computers. The interaction processing method of the present disclosure includes: displaying an interaction interface between a user and an interaction object; generating at least one emoji based on interaction information and a base image, in response to the user inputting the interaction information in an input area of the interaction interface, wherein the base image is an image authorized by the user and comprises a face; displaying the at least one emoji; and sending a first target emoji to the interaction object, in response to a conformation operation of the user on the first target emoji among the at least one emoji.

20 Claims, 6 Drawing Sheets

(51) Int. Cl.
    *G06V 40/10*     (2022.01)
    *G06V 40/16*     (2022.01)

(56) References Cited

U.S. PATENT DOCUMENTS

| | | | | |
|---|---|---|---|---|
| 2021/0382610 | A1* | 12/2021 | Prasad | G06F 3/04886 |
| 2021/0399911 | A1* | 12/2021 | Jorasch | H04L 12/1818 |
| 2022/0168644 | A1* | 6/2022 | Nelson | A63F 13/352 |
| 2024/0428470 | A1* | 12/2024 | Dela Rosa | G06V 10/7715 |

FOREIGN PATENT DOCUMENTS

| | | |
|---|---|---|
| CN | 110286756 A | 9/2019 |
| CN | 110599359 A | 12/2019 |
| CN | 116977492 A | 10/2023 |
| EP | 4141798 A1 | 3/2023 |
| WO | 2022193910 A1 | 3/2021 |

OTHER PUBLICATIONS

European Patent Office, Extended European Search Report Issued in Application No. 24863818.1, Oct. 28, 2025, Germany, 8 pages.

\* cited by examiner

INTERACTION PROCESSING METHODS, APPARATUS, ELECTRONIC DEVICES, STORAGE MEDIA, AND PROGRAM

CROSS-REFERENCE TO RELATED APPLICATIONS

This application is a continuation application, under 35 USC 111(a), of International Application No. PCT/CN2024/084864, filed on Mar. 29, 2024, the disclosure of which is hereby incorporated into this disclosure by reference in its entirety.

TECHNICAL FIELD

This disclosure relates to the field of computer technology, particularly to an interaction processing method, an apparatus, an electronic device, a storage medium, and a program product.

BACKGROUND

Today, a user can communicate or interact with an interaction object over networks in real time and send content to the interaction object in various forms such as voice, text, images, or video.

Communication applications usually have some preset emoji images (also known as emojis), and the user can select an emoji based on the current context and the meaning to be expressed and send the emoji to the interaction object, resulting in more vivid and animated interaction.

SUMMARY

This summary is provided for a concise introduction of the inventive concept of the present application, which will be described in detail in the Detailed Description section below. This summary is not intended to identify critical features or essential features of the claimed technical solution, nor is it intended to be used to limit the scope of the claimed technical solution.

According to some embodiments of the present disclosure, there is provided an interaction processing method, comprising: displaying an interaction interface for a user and an interaction object; generating at least one emoji based on interaction information and a base image, in response to the user inputting the interaction information in an input area of the interaction interface, wherein the base image is an image authorized by the user and comprises a face; displaying the at least one emoji; and sending a first target emoji to the interaction object, in response to a conformation operation of the user on the first target emoji among the at least one emoji.

According to other embodiments of the present disclosure, there is provided an interaction processing apparatus, comprising: a first display module configured for displaying an interaction interface for a user and an interaction object; a generation module configured for generating at least one emoji based on interaction information and a base image, in response to the user inputting the interaction information in an input area of the interaction interface, wherein the base image is an image authorized by the user and comprises a face; a second display module configured for displaying the at least one emoji; and a sending module configured for sending a first target emoji to the interaction object, in response to a conformation operation of the user on the first target emoji among the at least one emoji According to further embodiments of the present disclosure, there is provided an electronic device comprising: a processor; a memory coupled to the processor for storing instructions that, when executed by the processor, cause the processor to perform the interaction processing method provided by any embodiment of the present disclosure.

According to still further embodiments of the present disclosure, there is provided a computer readable storage medium having stored thereon a computer program that, when executed by a processor, implements the interaction processing method provided by any embodiment of the present disclosure.

According to further embodiments of the present disclosure, there is provided a computer program product, comprising: instructions that, when executed by a processor, cause the processor to perform the interaction processing method provided by any embodiment of the present disclosure.

According to further embodiments of the present disclosure, there is provided a computer program, comprising: instructions that, when executed by a processor, cause the processor to perform the interaction processing method provided by any embodiment of the present disclosure.

Other features, aspects and advantages of the present disclosure will become apparent from the following detailed description of exemplary embodiments of the present disclosure with reference to the accompanying drawings.

BRIEF DESCRIPTION OF THE DRAWINGS

Below, preferred embodiments of this disclosure will be described with reference to the drawings. The accompanying drawings described herein are intended to provide a further understanding of the present disclosure, and together with the specific description of the drawings below, are included in and constitute a part of the present specification for illustration of the present disclosure. It should be understood that the drawings described below merely involve some embodiments of the present disclosure, and are not limitations of the present disclosure. In the drawings.

Figure 1:
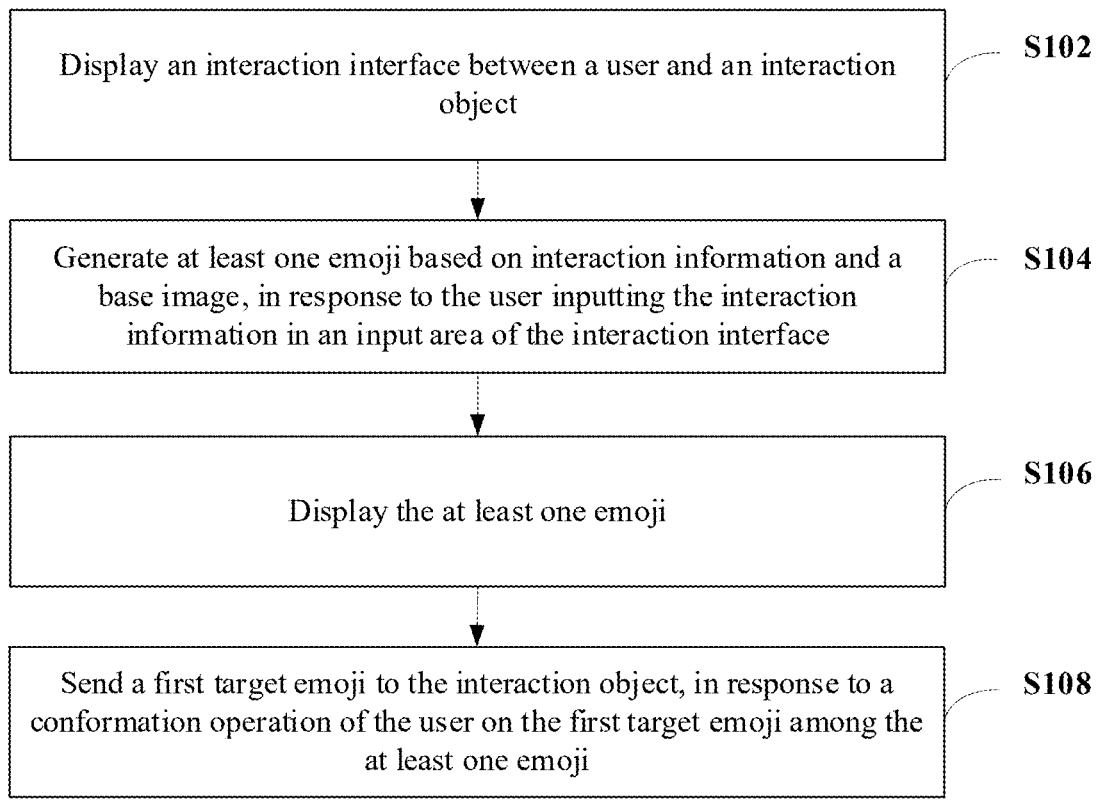
FIG. 1 shows a flowchart of an interaction processing method according to some embodiments of the present disclosure.

It should be understood that, for ease of description, the dimensions of the various parts shown in the drawings are not drawn to actual proportions. Throughout the drawings, the same or similar reference signs indicate the same or similar elements. Therefore, once an item is defined in a drawing, there is no need for further discussion in other accompanying drawings.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The description of the embodiments is merely illustrative, and in no way serves as any limitation on the present disclosure and its application or use. It should be understood that the present disclosure can be implemented in various forms and should not be construed as limited to the embodiments set forth herein.

It should be understood that the various steps described in the methods of the embodiments of the present disclosure may be executed in a different order, and/or executed in parallel. In addition, the methods may include additional steps and/or some of the illustrated steps may be omitted. The scope of this disclosure is not limited in this regard. Unless specifically stated otherwise, relative arrangement and values of components and steps, numerical expressions and values set forth in these embodiments are to be construed as merely illustrative, not limiting the scope of the present disclosure.

The term "including" and its variations used in this disclosure refer to an open-ended term that includes at least the following elements/features, but does not exclude other elements/features, i.e. "including but not limited to". In addition, the term "containing" and its variations used in this disclosure refer to an open-ended term that includes at least the following elements/features, but does not exclude other elements/features, i.e., "containing but not limited to". Therefore, the terms "including" and "containing" are synonymous. The term "based on" means "based at least in part on".

"One embodiment", "some embodiments" or "embodiments" used throughout the specification mean that specific features, structures or characteristics described in connection with the embodiments are included in at least one embodiment of the present invention. For example, the term "one embodiment" means "at least one embodiment"; the term "another embodiment" means "at least one additional embodiment"; the term "some embodiments" means "at least some embodiments". In addition, occurrences of the phrases "in one embodiment," "in some embodiments," or "in embodiments" throughout this specification do not necessarily refer to the same embodiment, but may refer to the same embodiment.

It should be noted that the concepts of "first" and "second" mentioned in the present disclosure are only used to distinguish different devices, modules or units, and are not used to limit the order of functions performed by these devices, modules or units, or interdependence therebetween. Unless otherwise specified, terms such as "first" and "second" are not intended to imply that objects described in this way must be in any particular order in time, space, rank, or otherwise.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

The following will provide a detailed explanation of the embodiments disclosed herein with reference to the accompanying drawings, but the present disclosure is not limited to these specific embodiments. The following specific embodiments can be combined with each other, and the same or similar concepts or processes may not be repeated in some embodiments. In addition, in one or more embodiments, specific features, structures or characteristics may be combined in any suitable manner, as will be apparent to those skilled in the art from this disclosure.

For example, scenarios in which a user communicates or interacts with an interaction object over a network include an instant messaging scenario. The interaction object may be a real object or a virtual object.

At present, when the user communicates or interact with the interaction object, he/she can send an emoji to the interaction object. Because emojis are usually provided by an application, on the one hand, the number and types of the emojis are limited, and the user cannot edit or perform other operations on the emojis, which is unable to meet personalized needs of the user. On the other hand, the user usually has to search to find an emoji that match the meaning to be expressed, which is inefficient.

In view of the problem of lack of flexibility and low efficiency in emoji generation, this disclosure proposes an interaction processing method described below with reference to FIGS. 1-4.

FIG. 1 is a flowchart of an interaction processing method according to some embodiments of the present disclosure. As shown in FIG. 1, the method of this embodiment includes steps S102 to S108.

In step S102, an interaction interface is displayed between a user and an interaction object.

For example, the interaction object may be a real object or a virtual object. For example, the interaction interface is an instant messaging interface (such as a chat interface), which can include an interaction information display area and an input area. The interaction information display area can be used to display interaction information communicated between the user and the interaction object. The input area can be used to input interaction information and display the interaction information for sending.

In step 104, at least one emoji is generated based on the interaction information and a base image, in response to the user inputting the interaction information in the input area of the interaction interface.

The interaction information may be in the form of text or speech, etc. The emoji may be a static image or a dynamic image. Emojis, also known as emotional images (emotional icons), memes (emoticons), etc., may be used to express specific emotions or feelings. An emoji can include a face of real person or a virtual character (such as an animated character) with a specific emoji. Of course, the emoji can also include limbs, a background, etc., as well as additional text, decorative materials, which are not limited to the examples given here.

For example, the base image is an image that has been authorized by the user and includes a face. The user can authorize images in various ways, which are not specifically limited here. The base image includes the face for generating an emoji. For example, the basic image may be an avatar of the user, an image uploaded by the user, etc., which is not limited to the examples given here.

For example, the interaction information can be analyzed and understood using a machine learning model, and the base image can be adjusted based on the interaction information to generate at least one emoji. For example, an expression and/or an angle of the face in the base image can be adjusted. For example, the background in the base image can be adjusted. For example, in a case where the base image includes limbs, a movement and/or an angle of the limbs in the base image can be adjusted. For example, 啊 decorative material may be added to the base image. Adjusting the base image can make it more consistent with the intended meaning of the interaction information.

In step S106, the at least one emoji is displayed.

For example, the at least one emoji is displayed in an emoji recommendation area. The emoji recommendation area may not be displayed when no emoji is generated, and may be used to display at least one emoji after the at least one emoji is generated. For example, the emoji recommendation area can be displayed in the form of a pop-up window, floating layer, bubble, etc., which is not limited to the examples given here. The emoji recommendation area may be displayed adjacent to the input area. If there are multiple emojis, some of the multiple emojis can be displayed in the emoji recommendation area, and the remaining emojis can be displayed in response to a switch operation (such as a slide switch operation) of the user. The at least one emoji is displayed in real-time after the user inputs the interaction information.

In step S108, a first target emoji is sent to the interaction object, in response to a conformation operation of the user on the first target emoji among the at least one emoji.

The user can select any emoji as the first target emoji. For example, the user selects the first target emoji by clicking on it and then sends it to the interaction object. For example, in response to the user selecting the first target emoji, the first target emoji is displayed in the input area, and in response to a sending operation of the user, the first target emoji image is sent to the interaction object.

In the method of the above embodiment, the user inputs the interaction information in the input area of the interaction interface. At least one emoji is directly generated and displayed based on the interaction information and the base image. The user can select and send the first target emoji from among the at least one emoji to convey desired content to the interaction object using the first target emoji. Since the base image is an image authorized by the user, that is, an image selected by the user for use, the at least one emoji generated based on the interaction information and the base image can more accurately represent the meaning the user wants to express. By generating a personalized emoji for the user, the flexibility of emoji generation is improved and the liveliness and fun of the interaction is enhanced, so as to better meet the user's needs. In addition, an emoji can be automatically generated by inputting interaction information without a need for the user to perform a search operation, thereby improving the efficiency of the emoji generation and utilization.

In some embodiments, the base image is an avatar the user, or the base image is an image selected by the user from a plurality of uploaded and authorized candidate images.

The avatar of the user can be displayed in the interaction interface, for example, by displaying the avatar of the user next to each piece of interaction information. After the user has authorized the use of the avatar, at least one emoji can be directly generated using the avatar. The user can predetermine an image that is used to generate the at least one emoji as the base image. For example, the user can upload multiple candidate images and specify which one is to be used as an avatar, which one is to be used to generate the at least one emoji, and which ones are to be used for other purposes. Alternatively, when the user interacts with the interaction object, an image can be selected as the base image from a set of uploaded and authorized candidate images. By using the avatar of the user or the image uploaded by the user, the at least one personalized emoji can be generated for the user to meet personalized needs of the user and improve the efficiency of emoji generation.

Some embodiments will be given below to illustrate how to generate the at least one emoji.

In some embodiments, an emotion analysis is performed on the interaction information to determine emotion information corresponding to the interaction information; and the at least one emoji is generated based on the emotion information and the base image.

For example, the interaction information and the base image are input into a generative model to output the at least one emoji. For example, the emotion analysis is performed on the interaction information using a machine learning model to determine the emotion information corresponding to the interaction information, and to generate the at least one emoji based on the emotion information and the base image. For example, the emotion information includes an emotion type, such as happiness, anger, sadness, and so on. For example, an emotion recognition is performed on the interaction information using a machine learning model to determine an emotion type, and then the at least one emoji is generated based on the emotion type and the base image. The at least one emoji reflects a same emotion as that expressed in the interaction information. For example, if the interaction information is "The weather is so nice today, let's go outside and have some fun," it can be determined that the emotion type is Happiness, and an expression on a face in the generated emoji will represent Happiness.

In a case where the interaction information is text, the emotion analysis can be performed directly. In a case where the interaction information is speech, the speech can be converted to text for emotion analysis, or the speech can be subjected directly to emotion analysis.

By performing the emotion analysis on the interaction information and generating the at least one emoji in combination with the base image, the generated emoji is better matched with the emotion that the user wants to express, thereby improving the flexibility of emoji generation and enhancing the liveliness and fun of the interaction, so as to better meeting the user's needs.

In some cases, it is difficult to accurately determine emotion information simply by performing the emotion analysis on the interaction information. It is necessary to take into account other contextual factors to improve the accuracy of the emotion analysis performed on the interaction information. For example, the same sentence can express different emotions in different contexts.

In some embodiments, the emotion analysis is performed based on the interaction information and interaction records prior to the interaction information to determine the emotion information corresponding to the interaction information; the at least one emoji is generated based on the emotion information and the base image.

A preset number of interaction records may be obtained, and a machine learning model may be used to determine the emotion information corresponding to the interaction information based on the interaction information and the interaction records. Then, the at least one emoji may be generated based on the emotion information and the base image.

The at least one emoji is generated based on the interaction information, the interaction records, and the base image, so that the at least one emoji can more accurately express the meaning that the user wants to express, thus satisfying the user's personalized needs while improving the efficiency of emoji generation.

In some embodiments, the face in the base image is recognized; at least one of an expression or an angle of the face is adjusted based on the emotion information to generate at least one image of the face in the at least one emoji.

For example, the face included in the base image is recognized using a face recognition technique. Some emotion information may be expressed by expression of the face combined with different angles of the face. For example, a laughing expression with a certain lifting angle of the face can express a very happy emotion. For example, a face turned away from the screen, i.e., a head turned away (or to the side), indicates a very depressed feeling of not wanting to speak. A machine learning model may be used to recognize emotion information, adjust at least one of the expression or the angle of the face in the base image based on the emotion information, so as to generate the at least one image of the face of the at least one emoji.

If an original expression in the base image can express the emotion information corresponding to the interaction information, no adjustment is required. Based on the emotion information, the expression and/or the angle of the face in the base image may be adjusted to accurately express the user's intended meaning to meet the user's personalized needs. Moreover, it can also improve the efficiency of emoji generation.

In addition to adjusting the expression and angle of the face to express different emotions, if the base image also contains other body parts such as body and limbs, those body parts can also be adjusted to express different emotions.

In some embodiments, limbs in the base image are recognized in the base image; at least one of a movement or an angle of the limbs is adjusted based on the emotion information to generate at least one image of the limbs in the at least one emoji.

The recognitions and adjustments of the face and the limbs can be synchronized, and the expression and angle of the face should be matched with the movement and angle of the limbs to express the same emotion and appear coordinated. For example, if the face is facing away from the screen, the body may also be adjusted to face away from the screen. For example, if the expression is helplessness, the movement of the limbs may be adjusted to spread out the hands. A machine learning model may be used to recognize emotion information, adjust at least one of the movement or the angle of the limbs for the base image based on the emotion information, and generate at least one image of the limbs for the at least one emoji.

If no limbs can be recognized in the base image, only the expression and/or angle of the face are adjusted. If the limbs can be recognized in the base image, the movement and/or the angle of the limbs can also be adjusted. If no limbs can be recognized in the base image, a movement of limbs can also be added to express emotion information. For example, a hand movement can be added to express a smile with the palm of the hand covering the mouth.

If the original expression of the face in the base image can express the emotion information corresponding to the interaction information, it is also possible to adjust only the movement and/or the angle of the limbs without adjusting the original expression. If the original movement of the limbs in the base image can express the emotion information corresponding to the interaction information, no adjustment of the original movement is required. Based on the emotion information, the movement and/or the angle of the limbs in the base image may be adjusted to accurately express the user's intended meaning to meet the user's personalized needs. Moreover, it can also improve the efficiency of emoji generation.

In addition to adjusting the face and limbs in the base image, a background or other elements can also be adjusted to improve the display effect of the emoji.

In some embodiments, at least one background image in the at least one emoji is generated based on the emotion information; and/or at least one decorative material to be added to the at least one emoji is generated based on the emotion information.

For example, the decorative materials include stickers, special effects materials, etc., which are not limited to the examples given here. The emotion information to be expressed may be enhanced using a background image and/or a decorative material. For example, if the user want to express a favorite emotion, the background may be replaced with a heart pattern and a heart sticker can be added on the face in the image.

In a case where the face and limbs are adjusted, an image of the face and an image of the limbs may be extracted, and after generating the background image, the generated background image may be synthesized with the image of the face and the image of the limbs to obtain an emoji. The decorative material may be added to a corresponding position on the face, the limbs or the background image. For example, a machine learning model can be used to identify the emotion information corresponding to the interaction information, generate the at least one background image in the at least one emoji based on the emotion information, and/or generate the at least one decorative material to be added to the at least one emoji based on the emotion information.

Based on the emotion information, the background image and/or the decorative material are generated to make the generated emoji more vivid and animated, and to enhance the emotion information to be expressed to meet the personalized needs of the user. Moreover, it can also improve the efficiency of emoji generation.

In the above embodiment, the background image is generated based on the emotion information. It is also possible to extract environmental features based on the interaction information to generate the background image.

In some embodiments, environmental feature information is determined based on the interaction information; at least one background image in the at least one emoji is generated based on the environmental feature information.

For example, the environmental features include features representing weather, scenes, and so on. For example, if the interaction information is "The weather is nice today and the mood is good," the generated background image may be an image of clear weather. For example, if the interaction information is "Let's go to Disneyland this weekend," the generated background image may be a scene from Disneyland. For example, a machine learning model is used to determine the environmental feature information based on the interaction information and generate the at least one background image in the at least one emoji based on the environmental feature information.

The current interaction information may contain no environmental features. In this case, the environmental features can be more accurately determined by taking the context into account.

In some embodiments, the environmental feature information is determined based on the interaction information and interaction records prior to the interaction information; the at least one background image in the at least one emoji is generated based on the environmental feature information.

A preset number of interaction records may be obtained, and a machine learning model may be used to determine the environmental feature information using the machine learning model based on the interaction information and the interaction records and generate the at least one background image in the at least one emoji based on the environmental feature information.

The generated at least one background image is combined with at least one adjusted image of the face or the human body (face and limbs) to obtain the at least one emoji.

In the above embodiment, the environmental feature information is determined based on the interaction information, and the at least one background image in the at least one emoji is generated, thereby allowing the generated emoji to better match the user's interaction content, making the emoji more vivid and animated, improving the display effect to meet the user's personalized needs, and improving the efficiency of emoji generation.

The at least one background image in the at least one emoji can be generated by combining the emotion information and the environmental feature information. It is also possible to prioritize the emotion information or the environmental feature information when generating the at least background image for the at least one emoji.

In some embodiments, the at least one emoji comprises multiple emojis, the multiple emojis are different in at least one of emoji, facial angle, limb movement, limb angle, background image, or decorative material.

For example, for an expression of happiness, a plurality of emojis with different smiling styles, different angles of the face, different movements of the limbs, etc. can be generated for selection by the user, which can better meet the user's personalized needs.

The multiple emojis may have different styles or expression forms. For example, the multiple emojis can correspond to oil painting style, anime style, etc.

In some embodiments, the at least one emoji comprises text corresponding to the interaction information, which is text or speech.

The interaction information input by the user may be text or speech. In a case of speech, the speech may be converted into corresponding text and added to the emoji. In this way, the emoji can accurately and animatedly express the content that the user wants to express by combining an image and text.

Below, some other embodiments of the present disclosure will be described with reference to FIG. 2.

Figure 2:
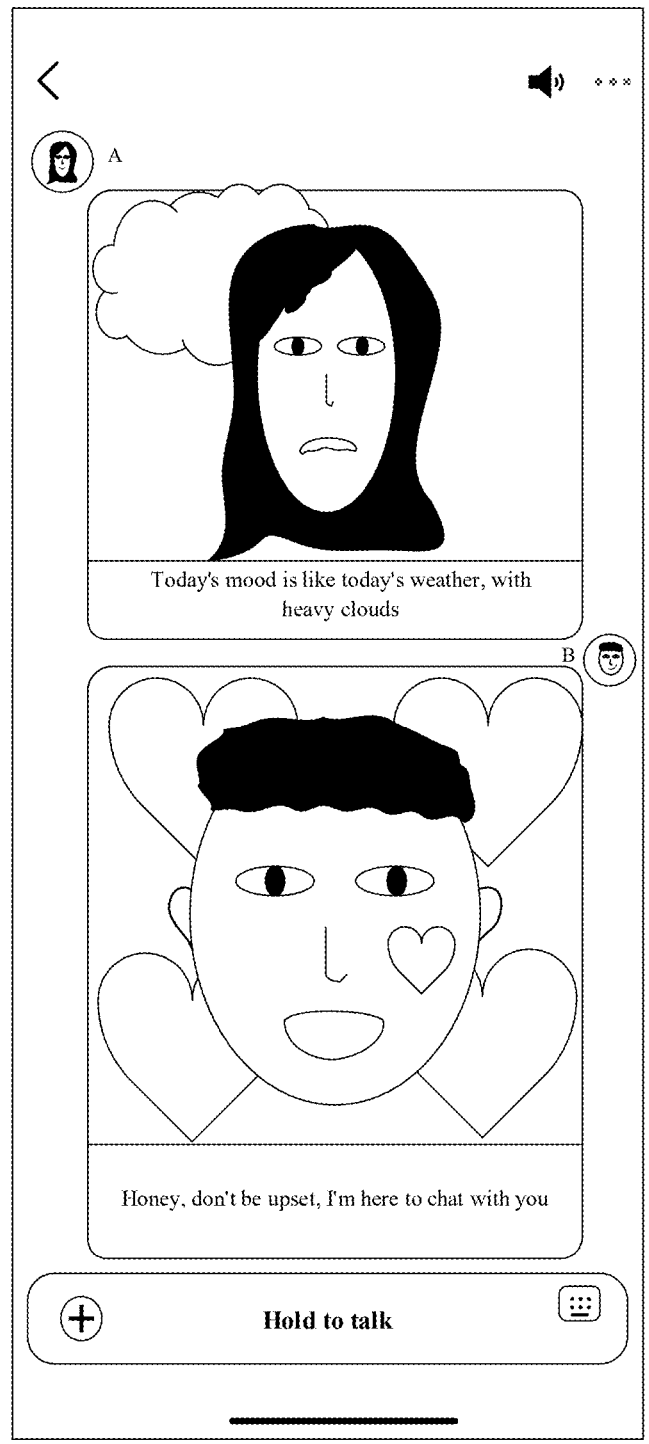
FIG. 2 shows a schematic diagram of an interaction interface according to some embodiments of the present disclosure.

FIG. 2 shows a conversation (interaction) interface between users A and B, in which user A sends interaction information "Today's mood is like today's weather, with heavy clouds". An emoji is generated based on the interaction information and an avatar of user A, in which the expression of user A is adjusted according to the interaction information, and a dark cloud pattern is added to the background based on the interaction information. User B sends interaction information "Honey, don't be upset, I'm here to chat with you". An emoji is generated based on the interaction information and an avatar of user B, in which the expression of user B is adjusted according to the interaction information, and the background is adjusted according to the interaction information by adding a heart sticker. It may be seen that the generation and use of emojis makes the interaction process between users more vivid and animated, which may enhance the interaction experience and better meet the personalized needs of the users.

At least one emoji may be generated for each piece of interaction information of the user, or in a case where the user continuously sends multiple pieces of interaction information, at least one emoji may be generated based on the multiple pieces of interaction information. Alternatively, in a case where the user continuously sends multiple pieces of interaction information, at least one emoji may be generated based on a first interaction information.

To further expand the form and content of emojis, two-character emojis can be generated with the authorizations of both the user and the interaction object.

In some embodiments, at least one emoji is generated based on the interaction information, the base image, and an image of the interaction object, wherein the image of the interaction object is an image authorized by the interaction object and includes a face of the interaction object.

For example, the image of the interaction object is an avatar of the interaction object, or an image selected by the interaction object from uploaded and authorized candidate images. The image of the interaction object is similar to the base image and can be obtained and authorized in various ways, which will not be repeated here. The generated at least one emoji may include an image corresponding to the face in the base image and an image corresponding to the face in the image of the interaction object.

In some embodiments, an image of a first character is extracted from the base image and an image of a second character is extracted from the image of the interaction object; the image of the first character and the image of the second character are adjusted based on the interaction information to obtain at least one adjusted image of the first character and at least one adjusted image of the second character; at least one background image in the at least one emoji is generated based on at least one of the interaction information, a background image in the base image, or a background image in the image of the interaction object; and at least one emoji is generated based on the at least one adjusted image of the first character, the at least one adjusted image of the second character, and the at least one background image in the at least one emoji.

The first character and second character may include faces and limbs. The first character and second character may be real or virtual characters (such as animated characters).

In some embodiments, adjusting the image of the first character and the image of the second character based on the interaction information comprises: performing an emotion analysis on the interaction information to determine emotion information corresponding to the interaction information, and adjusting the images of the first and second characters based on the emotion information. An expression and/or an angle of the face of the first character can be adjusted. An expression and/or an angle of the face of the second character can be adjusted. Moreover, a movement and/or an angle of the limbs of the first character can be adjusted. A movement and/or an angle of the limbs of the second character can be adjusted. For specific details, please refer to the embodiments of how to generate the at least one emoji based on the base image, which will not be repeated here.

The adjustment of the image of the first character and the adjustment of the image of the second character may be performed synchronously, so that the expression and movement of the first character can match that of the second character to convey the meaning of the interaction information.

In some embodiments, at least one of emotion information or environmental feature information corresponding to the interaction information is determined based on the interaction information, and at least one background image is generated based on the at least one of the emotion information or the environmental feature information. The at least one background image can also be obtained by adjusting the background image in the base image and/or the background image in the image of the interaction object based on the emotion information and the environmental feature information.

In some embodiments, at least one decorative material to be added to the at least one emoji are generated based on the interaction information and then added to the at least one emoji.

Those skilled in the art can understand that the method of generating the at least one emoji based on interaction information and the base image in the aforementioned embodiment is also applicable to generating two-character emojis, and will not be repeated here. When generating and displaying multiple emojis for the user, some emojis may be generated solely from the base image, while others may be emojis generated from both the base image and the image of the interaction object.

After generating and displaying the at least one emoji, the user can also adjust some or all of the at least one emoji to better meet personalized needs and accurately express the meaning to be expressed. Below, other embodiments of the interaction processing method of the present disclosure will be described in conjunction with FIG. 3.

Figure 3:
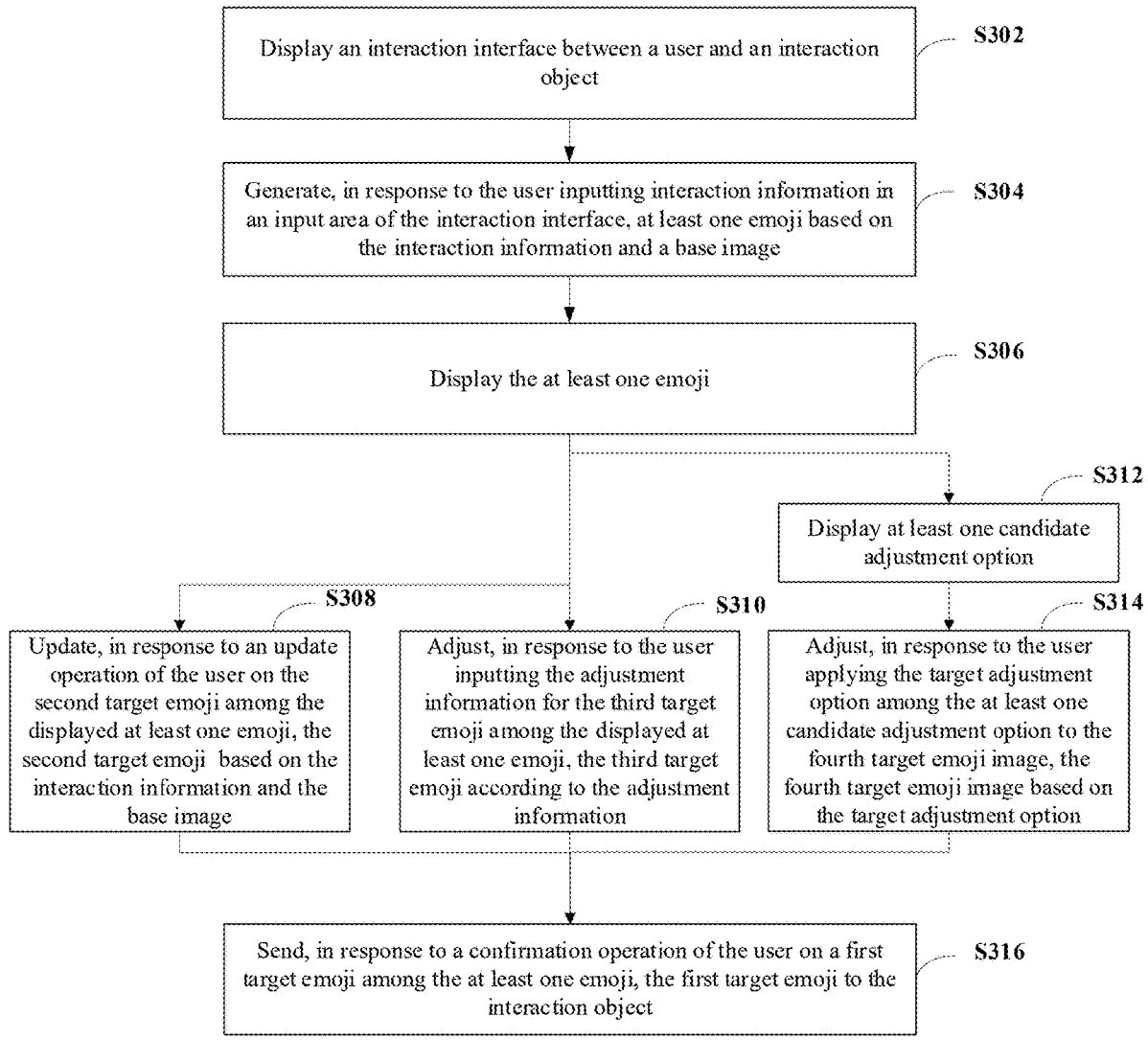
FIG. 3 shows a flowchart of an interaction processing method according to other embodiments of the present disclosure.

FIG. 3 is a flowchart of an interaction processing method according to some embodiments of the present disclosure. As shown in FIG. 3, the method of this embodiment includes steps S302 to S316.

In step S302, an interaction interface is displayed between a user and an interaction object.

In step 304, in response to the user inputting interaction information in an input area of the interaction interface, at least one emoji is generated based on the interaction information and a base image.

In step S306, the at least one emoji is displayed.

In step S308, in response to an update operation of the user on the second target emoji among the displayed at least one emoji, the second target emoji is updated based on the interaction information and the base image.

The second target emoji may be one or more emojis. An update control may be provided for each emoji, and the second target emoji is updated in response to the user triggering the update control of that second target emoji. Alternatively, an update control may be provided, and all the emojis are updated in response to the user triggering the update control. The updated second target emoji is a different from the previous one.

In step S310, in response to the user inputting the adjustment information for the third target emoji among the displayed at least one emoji, the third target emoji is adjusted according to the adjustment information.

For example, in response to the user selecting the third target emoji and inputting the adjustment information, the third target emoji is adjusted based on the adjustment information. For example, the adjustment information is adjustment information about at least one of emoji, facial angle, limb movement, limb angle, background image, decorative material or style. For example, the adjustment information may be "Change to a smile expression". The user can make various adjustments to the third target emoji according to his/her needs. The adjustment information may be input in the form of voice, text, etc.

In step S312, at least one candidate adjustment option is displayed, where different candidate adjustment options corresponding to different adjustment information.

The at least one candidate adjustment option may be used to adjust one or more emojis. Each candidate adjustment option can serve as an adjustment control and different candidate adjustment options are configured to adjust different aspects of an emoji. The at least one candidate adjustment option may be displayed as soon as the interaction interface is launched, or when the at least one emoji is displayed, which is not limited herein.

In step S314, in response to the user applying the target adjustment option among the at least one candidate adjustment option to the fourth target emoji image among the displayed at least one emoji, the fourth target emoji image is adjusted based on the target adjustment option.

The fourth target emoji may be one or more emojis, and may be adjusted by triggering the target adjustment option. In a case of multiple fourth target emojis, different target adjustment options may be applied to different fourth target emojis.

Figure 4:
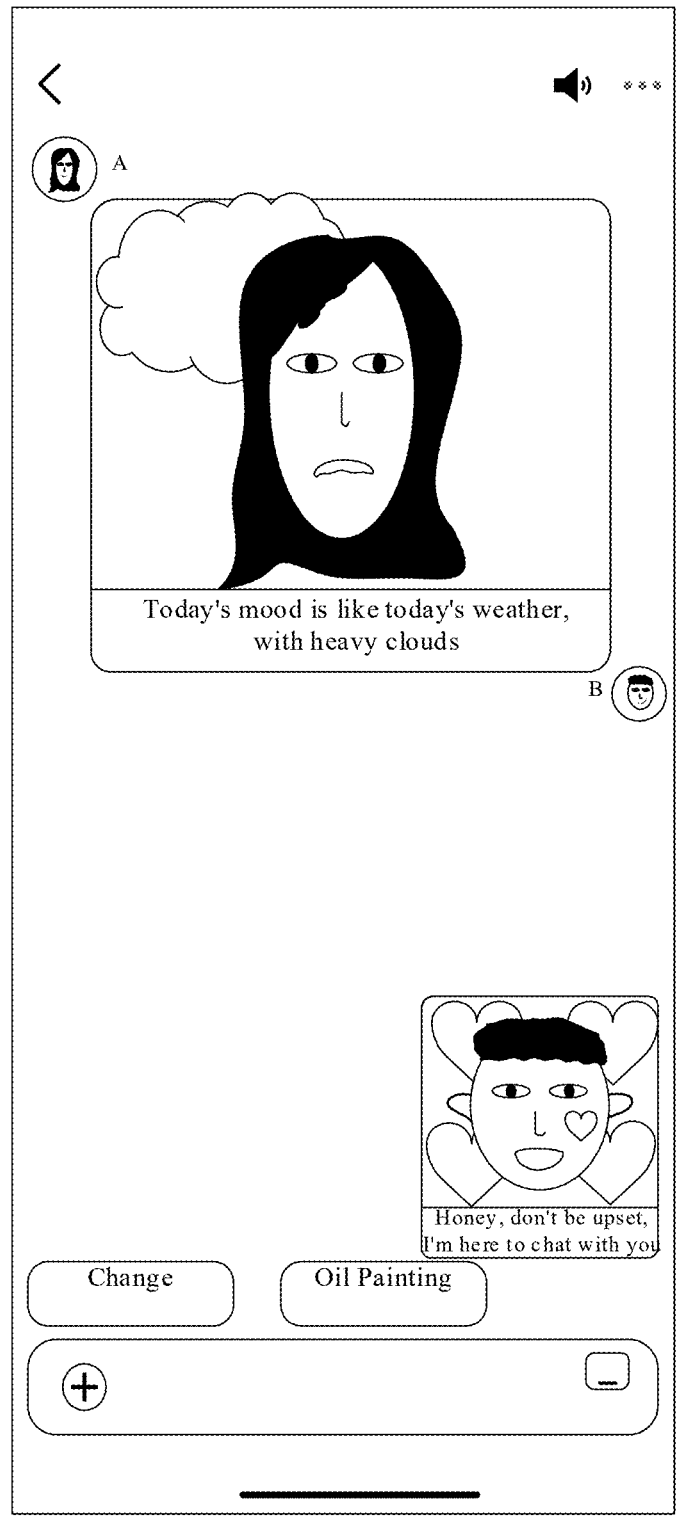
FIG. 4 shows a schematic diagram of an interaction interface according to other embodiments of the present disclosure.

As shown in FIG. 4, after the user inputs the interaction information "Honey, don't be upset, I'm here to chat with you", an emoji is generated and displayed in the emoji recommendation area in the form of a thumbnail. Multiple candidate adjustment options may be displayed above the input box of the input area, such as "Change Expression", "Oil Painting Style", etc. The user can apply a target adjustment option to the displayed emoji. For example, if the user selects "Oil Painting Style", the displayed emoji can be adjusted to look like an oil painting.

The order of steps S308, S310, S312 through S314 is not limited and these steps are all optional.

In some embodiments, the at least one emoji is displayed in the emoji recommendation area, and in response to the user selecting any emoji of the at least one emoji, the selected emoji is displayed in preview form.

The user can trigger a preview function for an emoji in several ways such as clicking and double clicking, etc. As shown in FIG. 4. The emoji is presented in the emoji recommendation area in the form of a thumbnail, and may be displayed in its normal size in the preview form to facilitate viewing by the user.

In step S316, in response to a confirmation operation of the user on a first target emoji among the at least one emoji, the first target emoji is sent to the interaction object.

In the method of the above embodiment, after generating the at least one emoji, the user can update and adjust any of them, such that the flexibility of emoji generation can be improved to better meet the personalized needs of the user, and the efficiency of emoji generation and utilization can be improved.

The present disclosure also provides an interaction processing apparatus, which will be described below with reference to FIG. 5.

Figure 5:
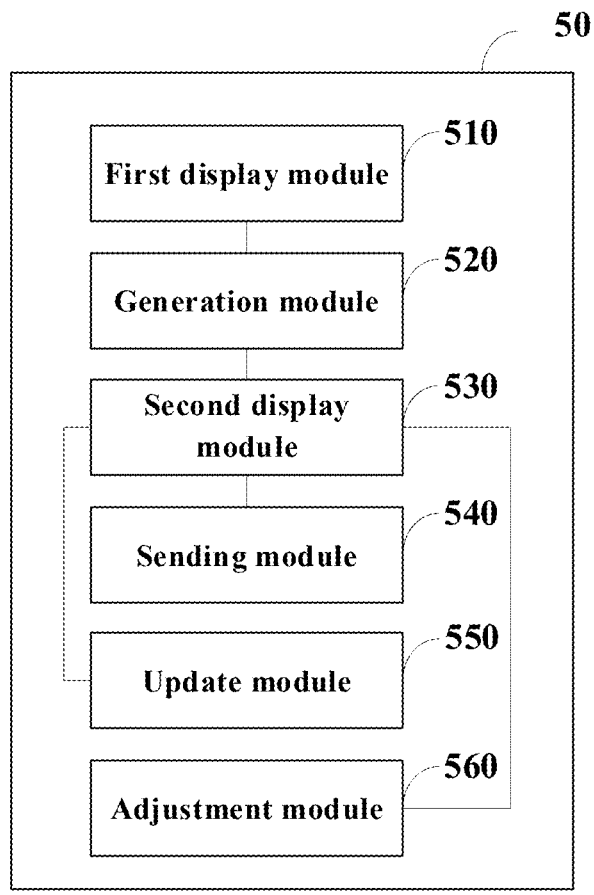
FIG. 5 is a schematic structural diagram of an interaction processing apparatus according to some embodiments of the present disclosure.

FIG. 5 is a block diagram of an interaction processing apparatus according to some embodiments of the present disclosure. As shown in FIG. 5, the interaction processing apparatus 50 of this embodiment comprises: a first display module 510, a generation module 520, a second display module 530, and a sending module 540.

The first display module 510 is configured for displaying an interaction interface between a user and an interaction object.

The generation module 520 is configured for generating at least one emoji based on interaction information and a base image, in response to the user inputting the interaction information in an input area of the interaction interface, wherein the base image is an image authorized by the user and comprises a face.

The second display module 530 is configured for displaying the at least one emoji.

The sending module 540 is configured for sending a first target emoji to the interaction object, in response to a conformation operation of the user on the first target emoji among the at least one emoji.

In some embodiments, the generation module 520 is configured for performing an emotion analysis on the interaction information to determine emotion information corresponding to the interaction information, and generating the at least one emoji based on the emotion information and the base image.

In some embodiments, the generation module 520 is configured for performing the emotion analysis based on the interaction information and interaction records prior to the interaction information to determine the emotion information corresponding to the interaction information.

In some embodiments, the generation module 520 is configured for recognizing the face in the base image, and adjusting at least one of an expression or an angle of the face based on the emotion information to generate at least one image of the face in the at least one emoji.

In some embodiments, the generation module 520 is configured for recognizing limbs in the base image, and adjusting at least one of a movement or an angle of the limbs based on the emotion information to generate at least one image of the limbs in the at least one emoji.

In some embodiments, the generation module 520 is configured for performing at least one of: generating at least one background image in the at least one emoji based on the emotion information, or generating at least one decorative material to be added to the at least one emoji based on the emotion information.

In some embodiments, the generation module 520 is configured for determining environmental feature information based on the interaction information, and generating at least one background image in the at least one emoji based on the environmental feature information.

In some embodiments, the generation module 520 is configured for determining the environmental feature information based on the interaction information and interaction records prior to the interaction information.

In some embodiments, the interaction processing apparatus further comprises: an update module 550 configure for updating a second target emoji based on the interaction information and the base image, in response to an update operation of the user on the second target emoji among the displayed at least one emoji.

In some embodiments, the interaction processing apparatus further comprises: an adjustment module 560 configured for adjusting a third target emoji according to adjustment information, in response to the user inputting the adjustment information for the third target emoji among the displayed at least one emoji.

In some embodiments, the display module 530 is configured for displaying at least one candidate adjustment option, wherein different candidate adjustment options correspond to different adjustment information; and the adjustment module 560 is configured for adjusting a fourth target emoji image based on a target adjustment option, in response to the user applying the target adjustment option among the at least one candidate adjustment option to the fourth target emoji image among the displayed at least one emoji.

In some embodiments, the generation module 520 is configured for generating the at least one emoji based on the interaction information, the base image, and an image of the interaction object, wherein the image of the interaction object is an image authorized by the interaction object and comprises a face of the interaction object.

In some embodiments, the generation module 520 is configured for extracting an image of a first character from the base image and an image of a second character from the image of the interaction object, adjusting the image of the first character and the image of the second character based on the interaction information to obtain at least one adjusted image of the first character and at least one adjusted image of the second character, generating at least one background image in the at least one emoji based on at least one of the interaction information, a background image in the base image, or a background image in the image of the interaction object, and generating the at least one emoji based on the at least one adjusted image of the first character, the at least one adjusted image of the second character, and the at least one background image in the at least one emoji.

In some embodiments, the display module 530 is configured for displaying a selected emoji in a preview form, in response to the user selecting any emoji of the at least one emoji.

In some embodiments, the base image is an avatar of the user, or the base image is an image selected by the user from a plurality of uploaded and authorized candidate images.

In some embodiments, the at least one emoji comprises multiple emojis, the multiple emojis are different in at least one of emoji, facial angle, limb movement, limb angle, background image, or decorative material.

In some embodiments, the at least one emoji comprises text corresponding to the interaction information, which is text or speech.

It should be noted that the above units (modules) are only logical modules divided according to their specific functions and are not intended to limit the specific ways in which they are implemented. For example, they may be implemented in software, hardware or a combination of software and hardware. In practical implementation, the above units may be implemented as independent physical entities, or they can also be implemented by a single entity (such as a processor (CPU or DSP), integrated circuit, etc.). In addition, the above units are indicated by dashed lines in the accompanying drawings, indicating that these units may not actually exist and that the operations/functions they perform may be performed by a processing circuit per se.

In addition, although not shown, the device may also include a memory that can store various information generated by the device or various units in the device during operation, programs and data used for operation, data to be sent by a communication unit, and so on. The memory may be volatile memory and/or non-volatile memory. For example, the memory may include, but is not limited to, random access memory (RAM), dynamic random access memory (DRAM), static random access memory (SRAM), read-only memory (ROM), and flash memory. Of course, the memory may also be located outside of the device. Optionally, although not shown, the device may also include a communication unit that may be used to communicate with other apparatus. In an example, the communication unit may be implemented in any suitable manner known in the art, including communication components such as an antenna array and/or radio frequency links, various types of interfaces, communication units, and so on, which will not be described in detail herein. In addition, the device may also include other components not shown, such as a RF link, a baseband processing unit, a network interface, a processor, a controller, etc., which will not be described in detail herein.

Figure 6:
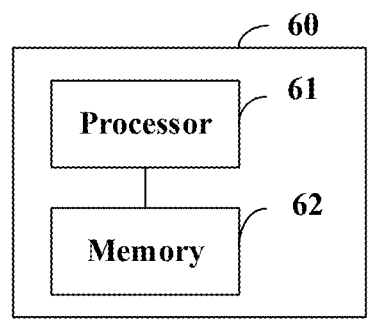
FIG. 6 shows a schematic structural diagram of an electronic device according to some embodiments of the present disclosure.

Some embodiments of the present disclosure further provide an electronic device. FIG. 6 shows a block diagram of an electronic device according to some embodiments of the present disclosure. For example, in some embodiments, the electronic device 60 may be any type of electronic device, such as, but not limited to, a mobile terminal such as a mobile phone, a laptop, a digital broadcast receiver, a PDA (personal digital assistant), a PAD (tablet computer), a PMP (portable multimedia player), a vehicle terminal (such as vehicle navigation terminal), or a fixed terminal such as a digital TV, a desktop computer, etc. For example, the electronic device 60 may include a display panel for displaying data and/or execution results utilized in the scheme of the present disclosure. For example, the display panel can have various shapes. For example, it can be a rectangular panel, an elliptical panel, or a polygonal panel. Furthermore, the display can be not only flat, but curved or even spherical.

As shown in FIG. 6, the electronic device 60 of this embodiment comprises: a memory 61 and a processor 62 coupled to the memory 61. It should be noted that the components of the electronic device 60 shown in FIG. 6 are illustrative and not limiting. Depending on the actual application requirements, the electronic device 60 may include other components. The processor 62 can control other components in the electronic device 60 to perform desired functions.

In some embodiments, the memory 61 is used to store one or more computer-readable instructions. These computer-readable instructions, when executed by the processor 62, implement the method according to any of the above embodiments. The specific implementation of each step of the method and related explanations can be found in the above embodiments, and will not be repeated here.

For example, the processor 62 and the memory 61 can directly or indirectly communicate with each other. For example, the processor 62 and the memory 61 can communicate over a network. The network can be a wireless network, a wired network, and/or any combination of wireless and wired networks. The processor 62 and the memory 61 may also communicate with each other over a system bus, and this disclosure is not limited thereto.

For example, the processor 62 may be embodied as various suitable processors, processing devices, etc., such as a central processing unit (CPU), a graphics processing unit (GPU), a network processor (NP), etc; It may also be a digital signal processor (DSP), application specific integrated circuit (ASIC), field programmable gate array (FPGA) or other programmable logic device, discrete gate or transistor logic device, or discrete hardware component. The central processing unit (CPU) may be based on X86 or ARM architecture. For example, the memory 61 may include any combination of various forms of computer-readable storage media, such as volatile memory and/or non-volatile memory. The memory 61 may include a system memory, which stores an operating system, application programs, a boot loader, a database, and other programs. Various applications and data can also be stored in the storage media.

Figure 7:
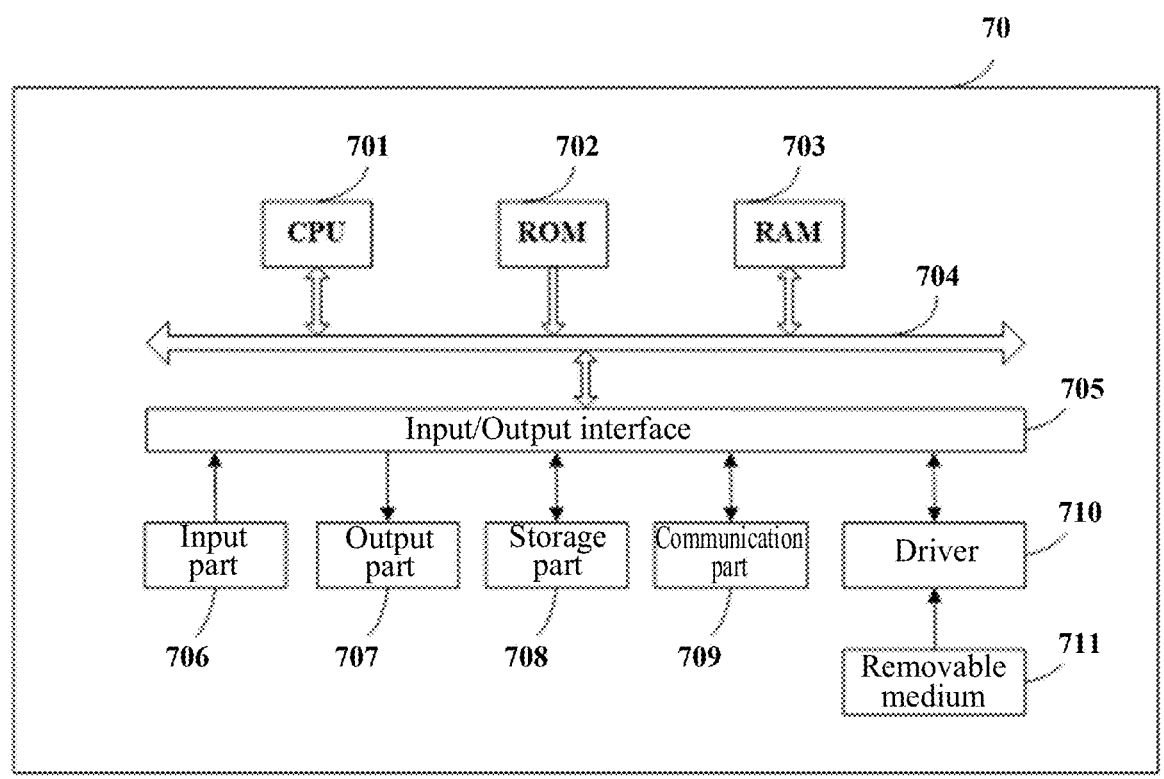
FIG. 7 shows a schematic structural diagram of a computer system according to some embodiments of the present disclosure.

In addition, according to some embodiments of the present disclosure, various operations/processes according to the present disclosure may be implemented by software and/or firmware, and programs constituting the software may be installed from storage media or networks on a computer system having dedicated hardware structures, such as the computer system (or electronic device) 70 shown in FIG. 7. The computer system with various programs installed can perform various functions, including functions such as those mentioned above. FIG. 7 is a block diagram illustrating an example structure of a computer system that may be used in the embodiments of the present disclosure.

In FIG. 7, the central processing unit (CPU) 701 performs various processes based on programs stored in the read-only memory (ROM) 702 or programs loaded from the storage device 708 to the random access memory (RAM) 703. Data required for CPU 701 to perform various processes is also stored in RAM 703 as needed. The central processing unit is for illustration only and may be other types of processor, such as the various processors mentioned above. The ROM 702, RAM 703, and storage section 708 may be various forms of computer readable storage media, as described below. It should be noted that although ROM 702, RAM 703, and storage device 708 are shown separately in FIG. 7, one or more of them may be combined or located in the same or different memory or storage modules.

The CPU 701, the ROM 702, and the RAM 703 are connected to each other via a bus 704. An input/output (I/O) interface 705 is also connected to the bus 704.

The following components are connected to the input/output interface 705: an input section 706, such as a touch screen, a touch pad, a keyboard, a mouse, an image sensor, a microphone, an accelerometer, a gyroscope, etc; an output section 707, including a display such as a cathode ray tube (CRT), liquid crystal display (LCD), a speaker, a vibrator, etc; a storage section 708, including a hard disk drive, a magnetic tape drive, etc; and a communication section 709 including a network interface card such as a LAN card, a modem, etc. The communication section 709 allows communication to be performed over a network such as the Internet. It is easy to understand that although the various devices or modules in the computer system 70 are shown in FIG. 7 communicating over the bus 704, they may also communicate over networks or other means, where the networks may include wireless networks, wired networks, and/or any combination of wireless and wired networks.

A drive 710 is also connected to input/output interface 705 as needed. A detachable medium 711, such as a magnetic disk, an optical disk, a magneto-optical disk, a semiconductor memory, etc., is mounted on the drive 710 as needed so that computer programs read from the medium can be installed in the memory section 708 as needed.

In the case of implementing the above series of processes by software, the programs that make up the software may be installed from a network, such as the Internet, or from a storage medium, such as the removable media 711.

According to an embodiment of the present disclosure, the processes described above with reference to the flowchart can be implemented as a computer software program. For example, some embodiments of the present disclosure include a computer program product comprising a computer program carried on a computer-readable medium, the computer program containing program code for performing the method illustrated in the flowcharts. In such an embodiment, the computer program may be downloaded and installed from the network via the communication device 709, or installed from the storage device 708 or from the ROM 702. When the computer program is executed by a CPU, the above functions defined in the method provided by the embodiment of the present disclosure are performed.

It should be noted that, in the context of the present disclosure, a computer-readable medium may be a tangible medium, which may contain or store a program for use by or in connection with an instruction execution system, apparatus, or device. The computer readable medium may be a computer readable signal medium or a computer readable storage medium, or any combination of thereof. The computer readable storage medium may be, but is not limited to: an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

The above computer readable medium may be included in the electronic device described above; or it may exist alone without being assembled into the electronic device.

In some embodiments, there is further provided a computer program, comprising: instructions that, when executed by a processor, cause the processor to perform the method provided in any of the above embodiments. For example, the instructions can be embodied as computer program code.

In embodiments of the present disclosure, computer program code for executing operations of the present disclosure may be complied by any combination of one or more program design languages, the program design languages including, but not limited to, object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an Internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules, components or units involved in the embodiments described in the present disclosure can be implemented by software or hardware. Wherein, the names of the modules, components or units do not constitute a limitation on the modules, components or units themselves under certain circumstances.

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

According to some embodiments of the present disclosure, there is provided an interaction processing method, comprising: displaying an interaction interface between a user and an interaction object; generating at least one emoji based on interaction information and a base image, in response to the user inputting the interaction information in an input area of the interaction interface, wherein the base image is an image authorized by the user and comprises a face; displaying the at least one emoji; and sending a first target emoji to the interaction object, in response to a conformation operation of the user on the first target emoji among the at least one emoji.

In some embodiments, the generating at least one emoji based on interaction information and a base image comprises: performing an emotion analysis on the interaction information to determine emotion information corresponding to the interaction information; and generating the at least one emoji based on the emotion information and the base image.

In some embodiments, the performing an emotion analysis on the interaction information to determine emotion information corresponding to the interaction information comprises: performing the emotion analysis based on the interaction information and interaction records prior to the interaction information to determine the emotion information corresponding to the interaction information.

In some embodiments, the generating the at least one emoji based on the emotion information and the base image comprises: recognizing the face in the base image; and adjusting at least one of an expression or an angle of the face based on the emotion information to generate at least one image of the face in the at least one emoji.

In some embodiments, the generating the at least one emoji based on the emotion information and the base image comprises: recognizing limbs in the base image; and adjusting at least one of a movement or an angle of the limbs based on the emotion information to generate at least one image of the limbs in the at least one emoji.

In some embodiments, the generating the at least one emoji based on the emotion information and the base image comprises at least one of: generating at least one background image in the at least one emoji based on the emotion information; or generating at least one decorative material to be added to the at least one emoji based on the emotion information.

In some embodiments, the generating the at least one emoji based on the emotion information and the base image comprises: determining environmental feature information based on the interaction information; and generating at least one background image in the at least one emoji based on the environmental feature information.

In some embodiments, the determining environmental feature information based on the interaction information comprises: determining the environmental feature information based on the interaction information and interaction records prior to the interaction information.

In some embodiments, the interaction processing method further comprises: updating a second target emoji based on the interaction information and the base image, in response to an update operation of the user on the second target emoji among the displayed at least one emoji.

In some embodiments, the interaction processing method further comprises: adjusting a third target emoji according to adjustment information, in response to the user inputting the adjustment information for the third target emoji among the displayed at least one emoji.

In some embodiments, the interaction processing method further comprises: displaying at least one candidate adjustment option, wherein different candidate adjustment options correspond to different adjustment information; and adjusting a fourth target emoji image based on a target adjustment option, in response to the user applying the target adjustment option among the at least one candidate adjustment option to the fourth target emoji image among the displayed at least one emoji.

In some embodiments, the generating at least one emoji based on the interaction information and the base image comprises: generating the at least one emoji based on the interaction information, the base image, and an image of the interaction object, wherein the image of the interaction object is an image authorized by the interaction object and comprises a face of the interaction object.

In some embodiments, the generating the at least one emoji based on the interaction information, the base image, and an image of the interaction object comprises: extracting an image of a first character from the base image and an image of a second character from the image of the interaction object; adjusting the image of the first character and the image of the second character based on the interaction information to obtain at least one adjusted image of the first character and at least one adjusted image of the second character; generating at least one background image in the at least one emoji based on at least one of the interaction information, a background image in the base image, or a background image in the image of the interaction object; and generating the at least one emoji based on the at least one adjusted image of the first character, the at least one adjusted image of the second character, and the at least one background image in the at least one emoji.

In some embodiments, the displaying the at least one emoji comprises displaying the at least one emoji in an emoji recommendation area, and the interaction processing method further comprises: displaying a selected emoji in a preview form, in response to the user selecting any emoji of the at least one emoji.

In some embodiments, the base image is an avatar of the user, or the base image is an image selected by the user from a plurality of uploaded and authorized candidate images.

In some embodiments, the at least one emoji comprises multiple emojis, the multiple emojis are different in at least one of emoji, facial angle, limb movement, limb angle, background image, or decorative material.

In some embodiments, the at least one emoji comprises text corresponding to the interaction information, which is text or speech.

According to other embodiments of the present disclosure, there is provided an interaction processing apparatus, comprising: a first display module configured for displaying an interaction interface between a user and an interaction object; a generation module configured for generating at least one emoji based on interaction information and a base image, in response to the user inputting the interaction information in an input area of the interaction interface, wherein the base image is an image authorized by the user and comprises a face; a second display module configured for displaying the at least one emoji; and a sending module configured for sending a first target emoji to the interaction object, in response to a conformation operation of the user on the first target emoji among the at least one emoji.

According to further embodiments of the present disclosure, there is provided an electronic device comprising: a processor; a memory coupled to the processor for storing instructions that, when executed by the processor, cause the processor to perform the interaction processing method provided by any embodiment of the present disclosure.

According to still further embodiments of the present disclosure, there is provided a computer readable storage medium having stored thereon a computer program that, when executed by a processor, implements the interaction processing method provided by any embodiment of the present disclosure.

According to further embodiments of the present disclosure, there is provided a computer program product, comprising: instructions that, when executed by a processor, cause the processor to perform the interaction processing method provided by any embodiment of the present disclosure.

According to further embodiments of the present disclosure, there is provided a computer program, comprising: instructions that, when executed by a processor, cause the processor to perform the interaction processing method provided by any embodiment of the present disclosure.

The above description only shows some embodiments of the present disclosure and illustrates technical principles applied in the present disclosure. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

Many specific details are elaborated in the description of the present disclosure. However, it is understood that embodiments of the present invention can be implemented without these specific details. In other cases, well-known methods, structures, and techniques are not described in detail so as not to obscure the understanding of the description.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. An interaction processing method, comprising:
   displaying an interaction interface between a user and an interaction object;
   generating at least one emoji based on interaction information and a base image, comprising: determining environmental feature information based on the interaction information, and generating at least one background image in the at least one emoji based on the environmental feature information, in response to the user inputting the interaction information in an input area of the interaction interface, wherein the base image is an image authorized by the user and comprises a face;
   displaying the at least one emoji; and
   sending a first target emoji to the interaction object, in response to a conformation operation of the user on the first target emoji among the at least one emoji.

2. The interaction processing method according to claim 1, wherein the generating at least one emoji based on interaction information and a base image comprises:
   performing an emotion analysis on the interaction information to determine emotion information corresponding to the interaction information; and
   generating the at least one emoji based on the emotion information and the base image.

3. The interaction processing method according to claim 2, wherein the performing an emotion analysis on the interaction information to determine emotion information corresponding to the interaction information comprises:
   performing the emotion analysis based on the interaction information and interaction records prior to the interaction information to determine the emotion information corresponding to the interaction information.

4. The interaction processing method according to claim 2, wherein the generating the at least one emoji based on the emotion information and the base image comprises:
   recognizing the face in the base image; and
   adjusting at least one of an expression or an angle of the face based on the emotion information to generate at least one image of the face in the at least one emoji.

5. The interaction processing method according to claim 2, wherein the generating the at least one emoji based on the emotion information and the base image comprises:
   recognizing limbs in the base image; and
   adjusting at least one of a movement or an angle of the limbs based on the emotion information to generate at least one image of the limbs in the at least one emoji.

6. The interaction processing method according to claim 2, wherein the generating the at least one emoji based on the emotion information and the base image comprises at least one of:
   generating at least one background image in the at least one emoji based on the emotion information; or
   generating at least one decorative material to be added to the at least one emoji based on the emotion information.

7. The interaction processing method according to claim 1, wherein the determining environmental feature information based on the interaction information comprises:
   determining the environmental feature information based on the interaction information and interaction records prior to the interaction information.

8. The interaction processing method according to claim 1, further comprising:
   updating a second target emoji based on the interaction information and the base image, in response to an update operation of the user on the second target emoji among the displayed at least one emoji.

9. The interaction processing method according to claim 1, further comprising:
   adjusting a third target emoji according to adjustment information, in response to the user inputting the adjustment information for the third target emoji among the displayed at least one emoji.

10. The interaction processing method according to claim 1, further comprising:
    displaying at least one candidate adjustment option, wherein different candidate adjustment options correspond to different adjustment information; and
    adjusting a fourth target emoji image based on a target adjustment option, in response to the user applying the target adjustment option among the at least one candidate adjustment option to the fourth target emoji image among the displayed at least one emoji.

11. The interaction processing method according to claim 1, wherein the generating at least one emoji based on the interaction information and the base image comprises:
    generating the at least one emoji based on the interaction information, the base image, and an image of the interaction object, wherein the image of the interaction object is an image authorized by the interaction object and comprises a face of the interaction object.

12. The interaction processing method according to claim 11, wherein the generating the at least one emoji based on the interaction information, the base image, and an image of the interaction object comprises:
    extracting an image of a first character from the base image and an image of a second character from the image of the interaction object;
    adjusting the image of the first character and the image of the second character based on the interaction information to obtain at least one adjusted image of the first character and at least one adjusted image of the second character;

generating at least one background image in the at least one emoji based on at least one of the interaction information, a background image in the base image, or a background image in the image of the interaction object; and generating the at least one emoji based on the at least one adjusted image of the first character, the at least one adjusted image of the second character, and the at least one background image in the at least one emoji.

13. The interaction processing method according to claim 1, wherein the displaying the at least one emoji comprises displaying the at least one emoji in an emoji recommendation area, and the interaction processing method further comprises: displaying a selected emoji in a preview form, in response to the user selecting any emoji of the at least one emoji.

14. The interaction processing method according to claim 1, wherein the base image is an avatar of the user, or the base image is an image selected by the user from a plurality of uploaded and authorized candidate images.

15. The interaction processing method according to claim 1, wherein the at least one emoji comprises text corresponding to the interaction information, which is text or speech.

16. An electronic device, comprising:
one or more processors; and
one or more memories coupled to the one or more processors for storing instructions that, when executed by the one or more processors, cause the one or more processors to perform the interaction processing method according to claim 1.

17. The electronic device according to claim 16, wherein the generating at least one emoji based on interaction information and a base image comprises:
performing an emotion analysis on the interaction information to determine emotion information corresponding to the interaction information; and
generating the at least one emoji based on the emotion information and the base image.

18. A non-transitory computer-readable storage medium stored thereon a computer program that, when executed by a processor, cause the processor to perform the interaction processing method according to claim 1.

19. An interaction processing method, comprising:
displaying an interaction interface between a user and an interaction object;
generating at least one emoji based on interaction information and a base image, in response to the user inputting the interaction information in an input area of the interaction interface, wherein the base image is an image authorized by the user and comprises a face, the at least one emoji comprises multiple emojis, and the multiple emojis are different in at least one of emoji, facial angle, limb movement, limb angle, background image, or decorative material;
displaying the at least one emoji; and
sending a first target emoji to the interaction object, in response to a conformation operation of the user on the first target emoji among the at least one emoji.

20. An interaction processing method, comprising:
displaying an interaction interface between a user and an interaction object;
generating at least one emoji based on interaction information and a base image, in response to the user inputting the interaction information in an input area of the interaction interface, wherein the base image is an image authorized by the user and comprises a face;
displaying the at least one emoji; and
sending a first target emoji to the interaction object, in response to a conformation operation of the user on the first target emoji among the at least one emoji;
wherein the generating the at least one emoji based on the interaction information and the base image comprises:
performing an emotion analysis on the interaction information to determine emotion information corresponding to the interaction information; and
generating at least one background image in the at least one emoji based on the emotion information, and/or generating at least one decorative material to be added to the at least one emoji based on the emotion information.

* * * * *